(12) United States Patent
Wei et al.

(10) Patent No.: US 8,269,367 B2
(45) Date of Patent: Sep. 18, 2012

(54) SHAFT BRAKE MECHANISM OF WIND POWER GENERATOR

(75) Inventors: Jhen-You Wei, Taichung (TW);
Kuo-Yuan Tsai, Taichung (TW);
En-Feng Chen, Taichung (TW);
Tzu-Yao Huang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 425 days.

(21) Appl. No.: 12/686,543

(22) Filed: Jan. 13, 2010

(65) Prior Publication Data

US 2011/0169268 A1 Jul. 14, 2011

(51) Int. Cl.
*F03D 9/00* (2006.01)
*H02P 9/04* (2006.01)
*B60T 13/74* (2006.01)
*B64C 11/00* (2006.01)
*B64C 27/00* (2006.01)

(52) U.S. Cl. .................... 290/55; 290/44; 303/2; 416/1; 416/169 R

(58) Field of Classification Search .................. 290/44, 290/55; 303/2; 416/1, 169 R
See application file for complete search history.

(56) References Cited

U.S. PATENT DOCUMENTS

| | | | | |
|---|---|---|---|---|
| 4,297,075 A * | 10/1981 | Jacobs et al. | ........ | 416/14 |
| 4,565,929 A * | 1/1986 | Baskin et al. | ........ | 290/44 |
| 4,578,019 A * | 3/1986 | Safarik | ........ | 416/1 |
| 4,692,093 A * | 9/1987 | Safarik | ........ | 416/1 |
| 5,779,325 A * | 7/1998 | Diesel | ........ | 303/72 |
| 6,254,197 B1 * | 7/2001 | Lading et al. | ........ | 303/2 |
| 7,357,462 B2 * | 4/2008 | Uphues | ........ | 303/2 |
| 7,709,972 B2 * | 5/2010 | Arinaga et al. | ........ | 290/55 |
| 7,884,493 B2 * | 2/2011 | Buskirk et al. | ........ | 290/55 |
| 8,047,770 B2 * | 11/2011 | Braicks | ........ | 415/123 |
| 8,096,773 B2 * | 1/2012 | Chang | ........ | 416/169 R |
| 8,123,304 B2 * | 2/2012 | Roed et al. | ........ | 303/2 |
| 2009/0058086 A1 * | 3/2009 | Arinaga et al. | ........ | 290/44 |
| 2009/0096213 A1 * | 4/2009 | Berglund | ........ | 290/44 |
| 2010/0079019 A1 * | 4/2010 | Buskirk et al. | ........ | 310/77 |
| 2010/0123314 A1 * | 5/2010 | Menke | ........ | 290/44 |
| 2010/0258390 A1 * | 10/2010 | Culbertson | ........ | 188/156 |
| 2010/0329867 A1 * | 12/2010 | Patel et al. | ........ | 416/169 R |
| 2011/0014048 A1 * | 1/2011 | Roed et al. | ........ | 416/169 R |
| 2011/0033291 A1 * | 2/2011 | Moore et al. | ........ | 416/1 |
| 2011/0135465 A1 * | 6/2011 | Braicks | ........ | 416/1 |
| 2011/0140425 A1 * | 6/2011 | Staedler | ........ | 290/44 |
| 2011/0142626 A1 * | 6/2011 | Hanson et al. | ........ | 416/9 |
| 2011/0215738 A1 * | 9/2011 | Kamen et al. | ........ | 315/302 |
| 2011/0221193 A1 * | 9/2011 | Kalen et al. | ........ | 290/44 |
| 2012/0068463 A1 * | 3/2012 | Langenfeld et al. | ........ | 290/44 |
| 2012/0133147 A1 * | 5/2012 | Numajiri | ........ | 290/55 |

* cited by examiner

*Primary Examiner* — Pedro J Cuevas
(74) *Attorney, Agent, or Firm* — Guice Patents PLLC

(57) ABSTRACT

A shaft brake mechanism of wind power generator, including a first brake assembly and a second brake assembly independent from each other. The first brake assembly serves to provide braking effect for the shaft of the wind power generator against rotation. The second brake assembly serves to naturally restrain the rotational speed of the shaft from exceeding a nominal upper limit of rotational speed. Accordingly, the wind power generator can still safely operate in a situation that the wind speed exceeds a nominal upper limit of wind speed. Therefore, the wind speed range for the operation of the wind power generator is widened to increase the total power generation capacity thereof.

5 Claims, 8 Drawing Sheets

SHAFT BRAKE MECHANISM OF WIND POWER GENERATOR

BACKGROUND OF THE INVENTION

The present invention relates generally to wind power generation, and more particularly to a shaft brake mechanism of wind power generator.

In wind power generation, as the wind blows, the blades are driven to make the shaft of the generator rotate for converting kinetic energy into electrical energy. However, it is necessary to brake the shaft against rotation in some situations. Conventionally, an electromagnetic brake system is generally used to provide braking effect for the shaft. Such electromagnetic brake system must be continuously powered to keep providing braking effect or stop providing braking effect, allowing the shaft to rotate. As a result, a large amount of electrical energy is consumed for maintaining the function of such electromagnetic brake system.

Moreover, as shown in FIG. 10A, when a wind power generator operates in a condition that the rotational speed exceeds a nominal upper limit t1, the safety in operation will be threatened. Therefore, in the case that the wind speed exceeds a nominal upper limit t2 of wind speed and the rotational speed of the shaft reaches the nominal upper limit t1, it is necessary to stop the system. In this case, the total power generation capacity of the wind power generator will be reduced and the natural wind power resource can be hardly fully utilized to cause waste of resource.

SUMMARY OF THE INVENTION

It is therefore a primary object of the present invention to provide a shaft brake mechanism of wind power generator, in which the electrical power for providing braking effect for the shaft is much less than that of the conventional device. Therefore, the shaft brake mechanism of the present invention has energy-saving effect.

It is a further object of the present invention to provide the above shaft brake mechanism of wind power generator, in which a smaller force is input to create a greater output force for providing braking effect for the shaft. Therefore, the shaft brake mechanism of the present invention has power-saving effect.

It is still a further object of the present invention to provide the above shaft brake mechanism of wind power generator, which can naturally restrain the rotational speed of the shaft from proportionally increasing with the wind speed. Therefore, the wind power generator can still safely operate in a condition that the wind speed exceeds a nominal upper limit of wind speed. Accordingly, without modifying the nominal upper limit of rotational speed, the nominal upper limit of wind speed can increase to increase total power generation capacity.

To achieve the above and other objects, with respect to the energy-saving effect and power-saving effect, the shaft brake mechanism of wind power generator of the present invention includes: a shaft; an annular disc coaxially fixedly fitted around the shaft and synchronously rotatable with the shaft; a clamping section having two first fulcrums and two elongated rock arms each having a first end, a middle section and a second end, the middle sections of the rock arms being respectively pivotally connected with the first fulcrums, the clamping section further having two clamping members respectively pivotally connected with the first ends of the rock arms and rotatable between a clamping position and a releasing position, when positioned in the clamping position, the clamping members tightly abutting against two faces of the disc to brake the disc against rotation, when positioned in the releasing position, the clamping members moving away from the two faces of the disc, a resilient member being bridged between the second ends of the rock arms for resiliently keeping the clamping members in the releasing position; a link section having a second fulcrum and a bar member having a first end, a middle section and a second end, the first end of the bar member being pivotally connected with the second fulcrum, whereby the bar member is rotatable about the second fulcrum between a first position and a second position, the link section further having a push block with a substantially trapezoidal cross section, the push block having two lateral slopes respectively adjacent to the second ends of the rock arms, a middle section of the push block being pivotally connected with the middle section of the bar member, when the bar member is moved to the first position, the push block being urged to move toward the first ends of the rock arms and interpose between the second ends thereof, whereby the two lateral slopes push the second ends of the rock arms away from each other to make the clamping members move to the clamping position, when the bar member is moved to the second position, the push block being moved from between the second ends of the rock arms, whereby the resilient member applies a resilient force to the rock arms to restore the clamping members to the releasing position; and a drive section for supplying power to drive and reciprocally move the bar member between the first position and the second position.

With respect to the increase of the nominal upper limit of wind speed without modification of the nominal upper limit of rotational speed, the shaft brake mechanism of wind power generator of the present invention includes: a shaft; a pier having a seat body, a shaft hole being formed through the seat body, the shaft being coaxially rotatably fitted through the shaft hole; a hoof section having an annular base coaxially fitted around and fixedly connected with the shaft, the hoof section further having at least two hoofs each having a pivot shaft, the hoofs being respectively pivotally mounted on the base via the pivot shafts and positioned around the shaft at equal angular intervals, the hoofs being arranged in a pattern centered at an axis of the shaft with the pivot shafts parallel to the axis of the shaft, whereby the hoofs can be pivotally rotated about the pivot shafts between a braking position and a releasing position, at least one resilient member being bridged between the hoofs for resiliently restoring the hoofs from the braking position to the releasing position; and a ring-shaped drum fixedly mounted on the seat body of the pier, the shaft coaxially passing through the drum with the hoofs facing an inner circumference of the drum, the hoofs being synchronously rotated with the shaft, when a centrifugal force applied to the hoofs overcomes resilient force of the resilient member, the hoofs moving from the releasing position to the braking position where the hoofs abut against the inner circumference of the drum, whereby under frictional force between the hoofs and the drum, the shaft is restrained against rotation to prevent rotational speed of the shaft from unlimitedly increasing.

The present invention can be best understood through the following description and accompanying drawings, wherein:

DETAILED DESCRIPTION OF THE PREFERRED EMBODIMENT

Figure 1:
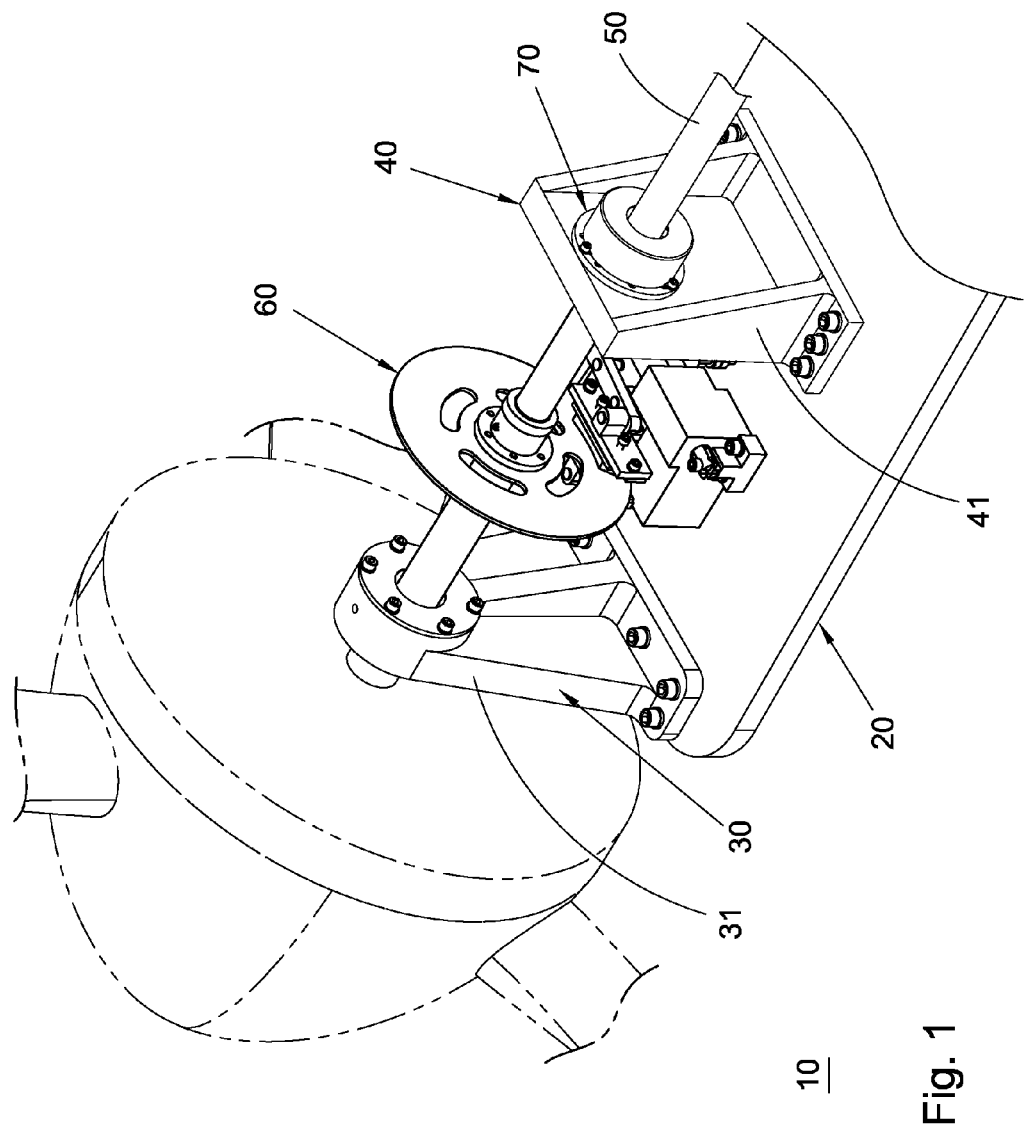
FIG. 1 is a perspective assembled view of a preferred embodiment of the present invention.
Figure 2:
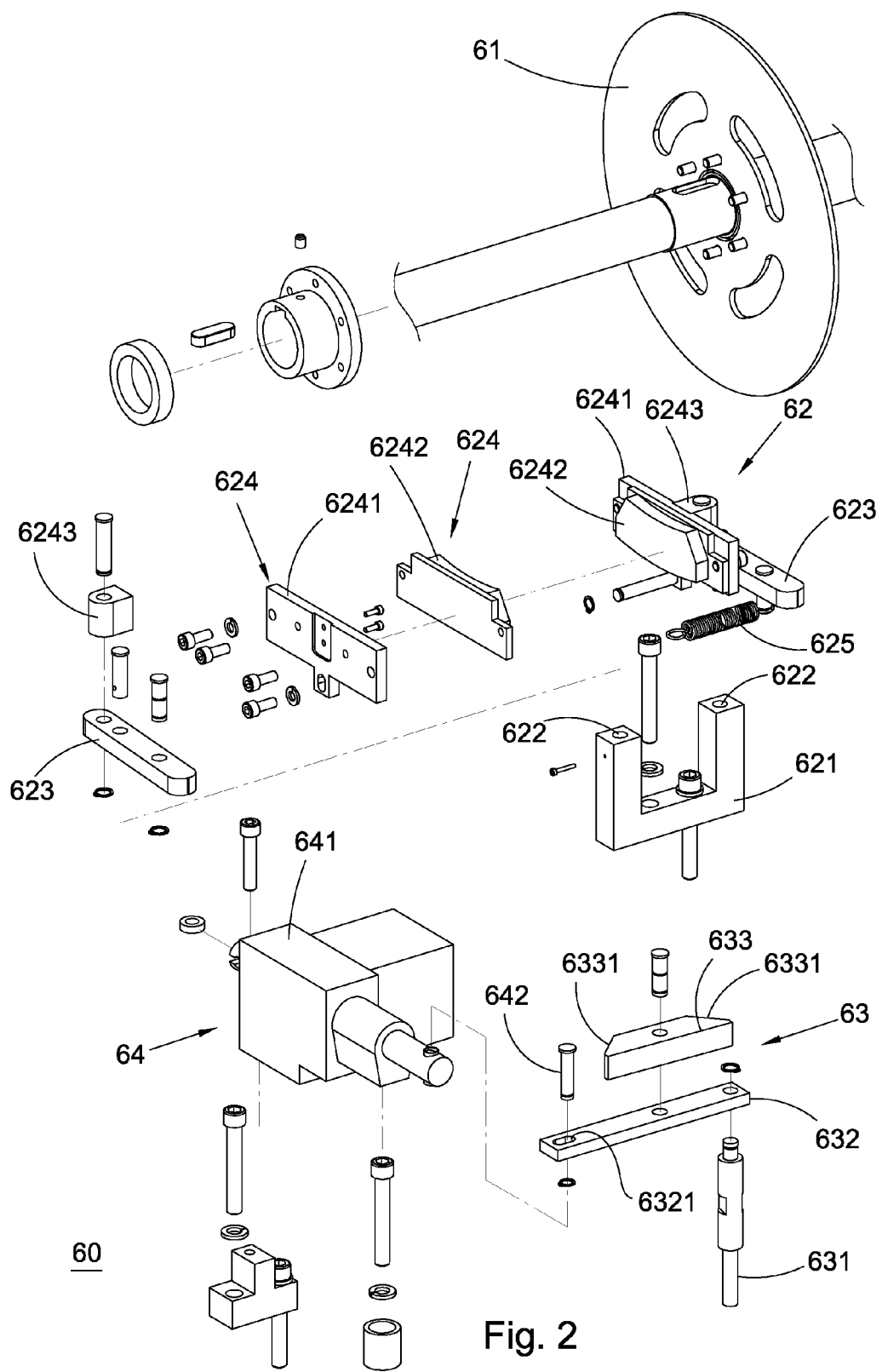
FIG. 2 is a perspective exploded view of the first brake assembly of the preferred embodiment of the present invention.
Figure 3:
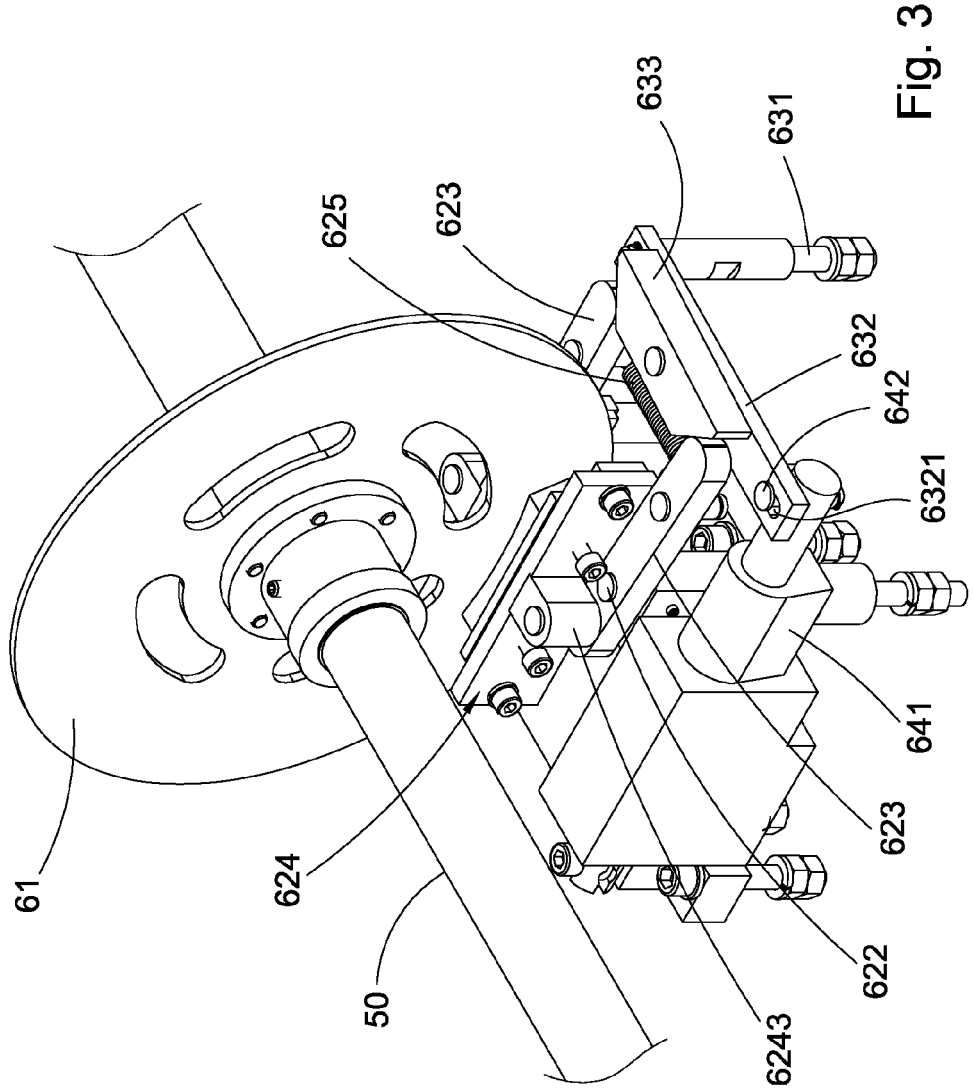
FIG. 3 is a perspective assembled view of the first brake assembly of the preferred embodiment of the present invention.
Figure 5:
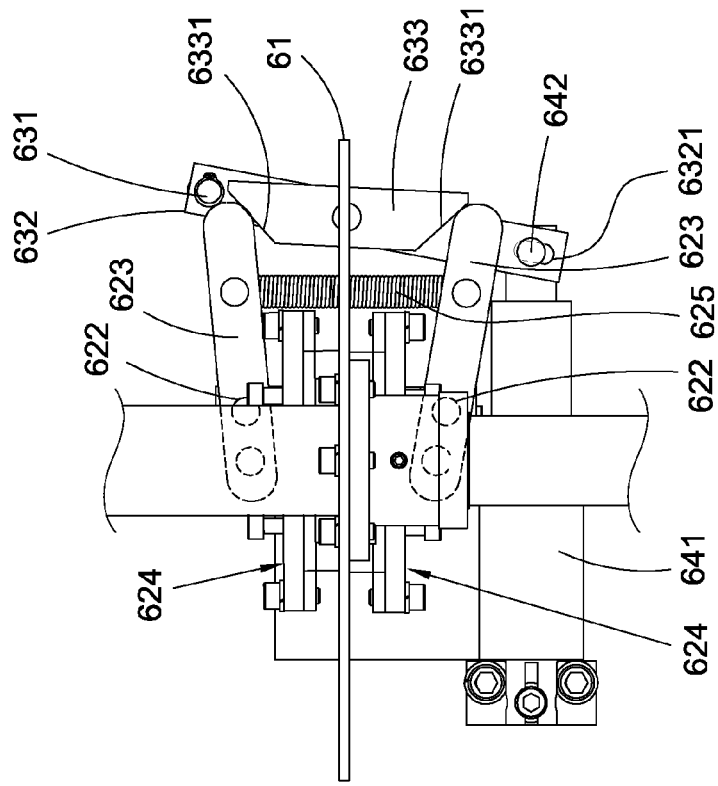
FIG. 5 is a plane view of the preferred embodiment of the present invention according to FIG. 4, showing that the first brake assembly is actuated to brake the shaft.
Figure 4:
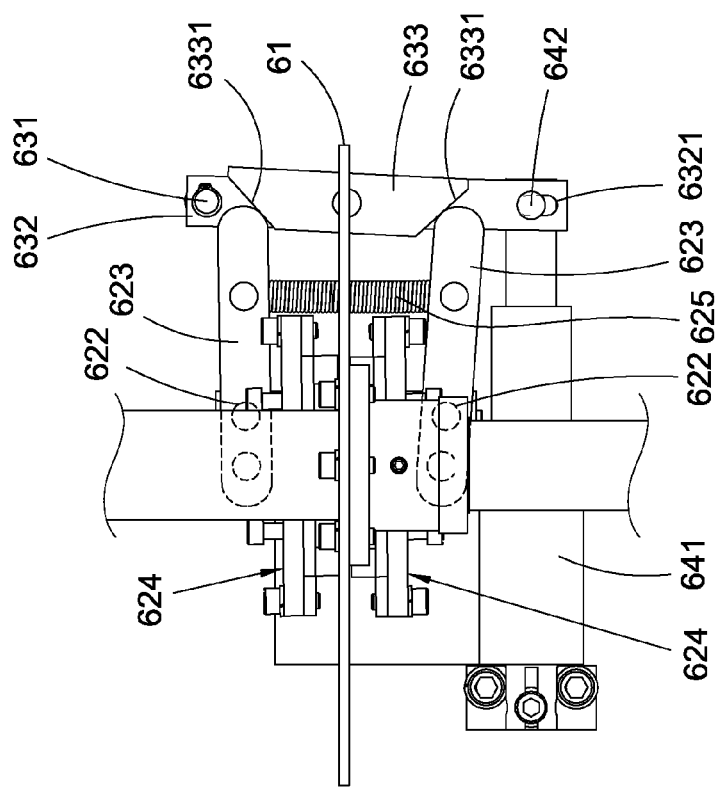
FIG. 4 is a plane view of the preferred embodiment of the present invention, showing that the first brake assembly releases the shaft.
Figure 6:
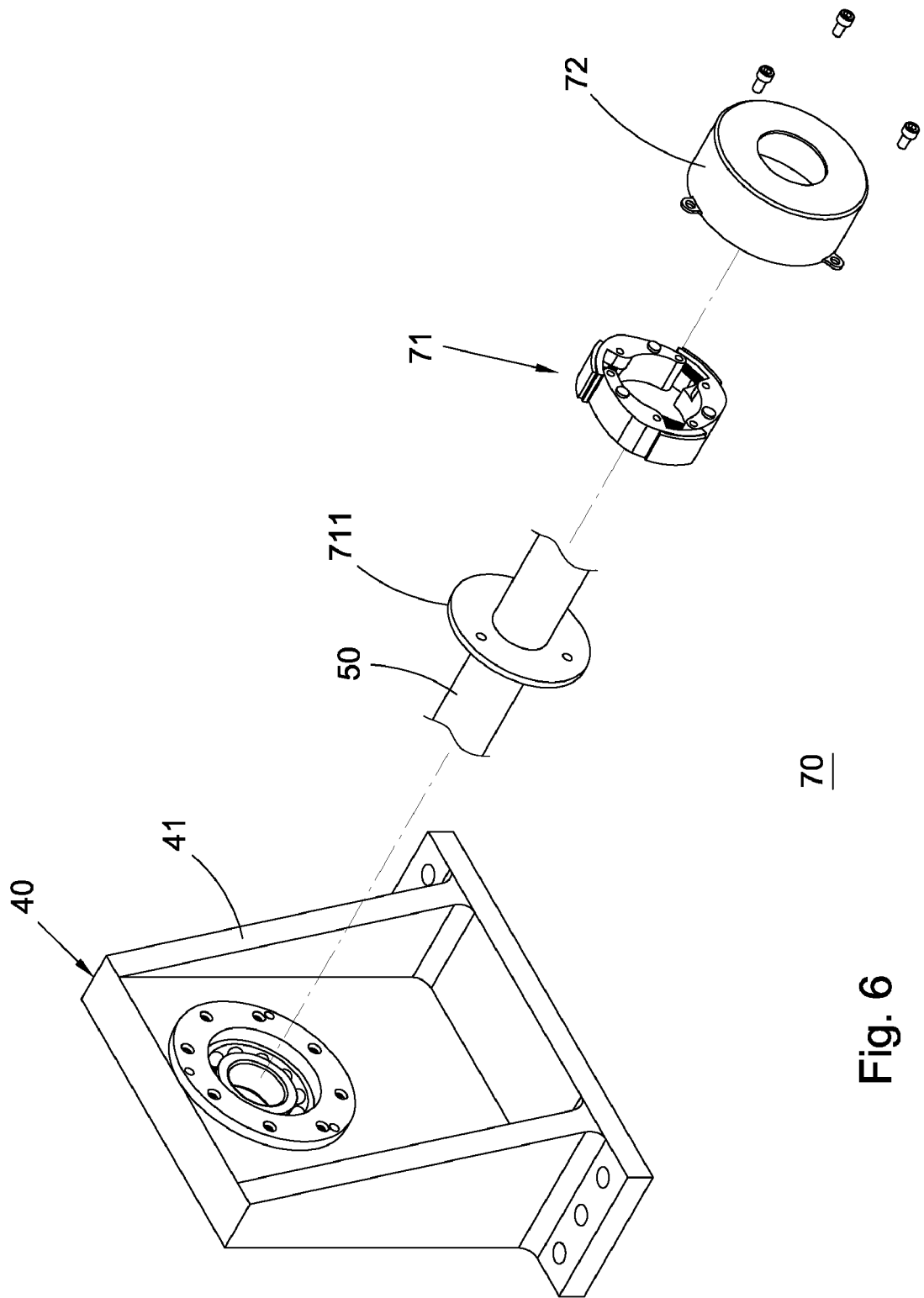
FIG. 6 is a perspective exploded view of the second brake assembly of the preferred embodiment of the present invention.
Figure 7:
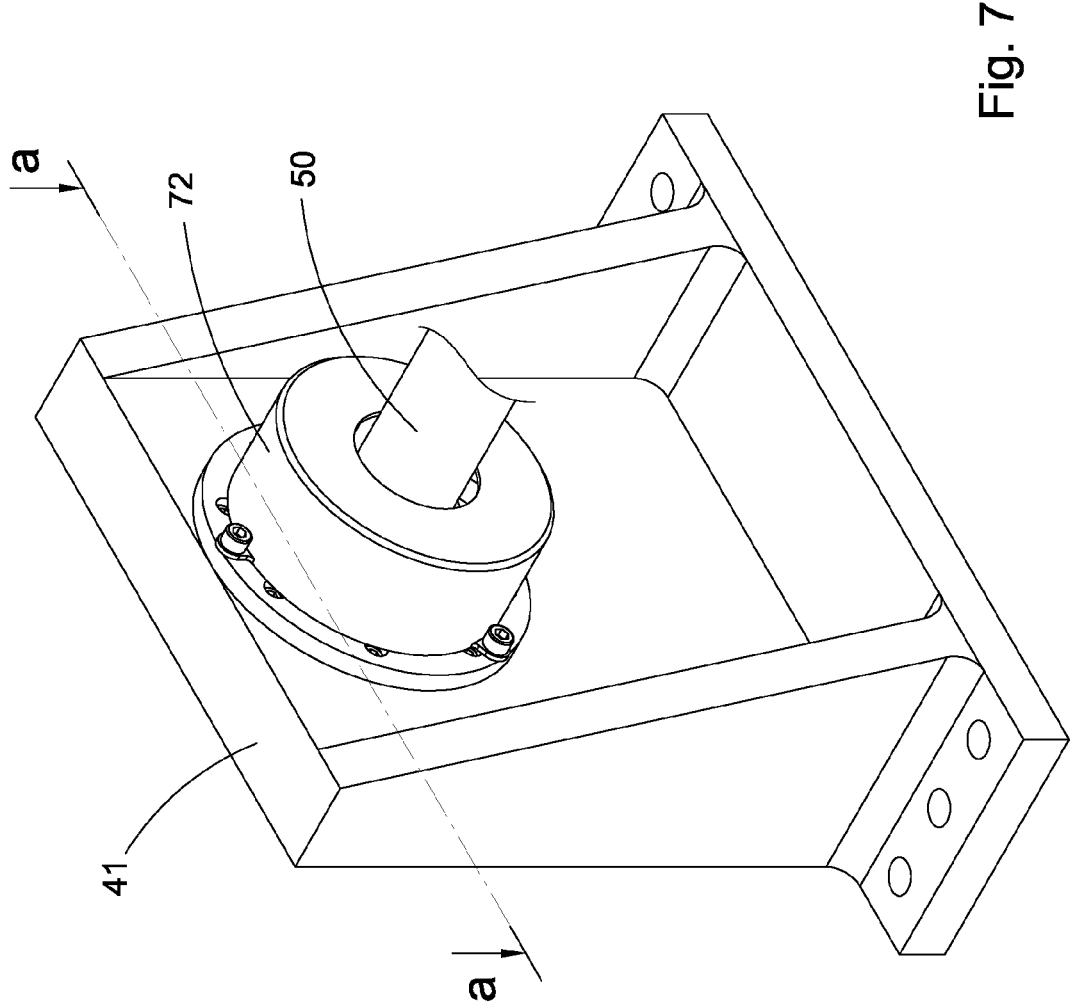
FIG. 7 is a perspective assembled view of the second brake assembly of the preferred embodiment of the present invention.
Figure 9:
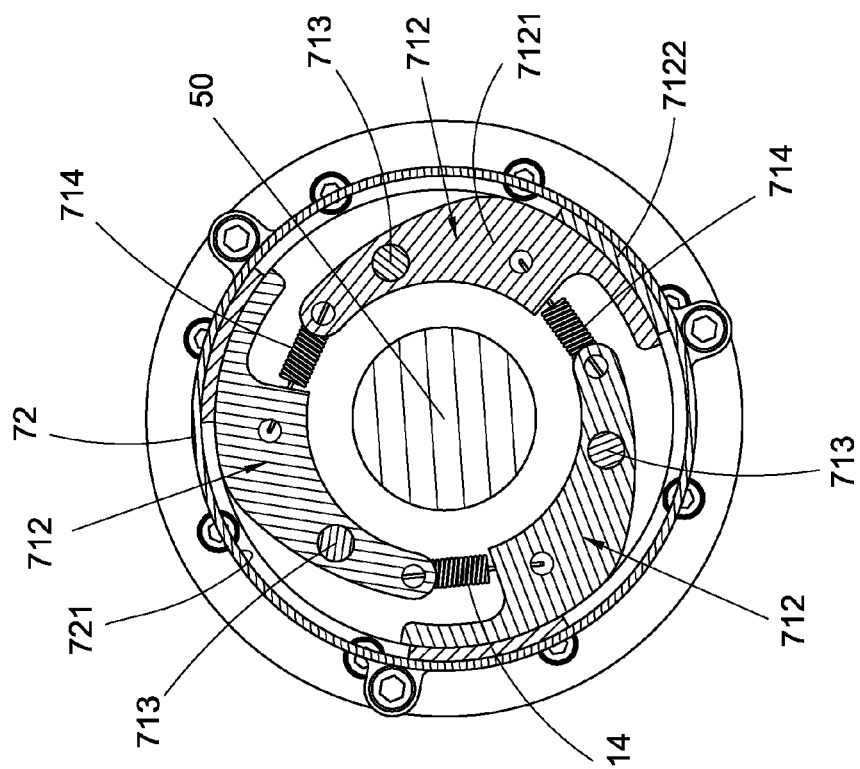
FIG. 9 is a sectional view according to FIG. 8, showing that the second brake assembly naturally brakes the shaft when the rotational speed of the shaft increases.
Figure 8:
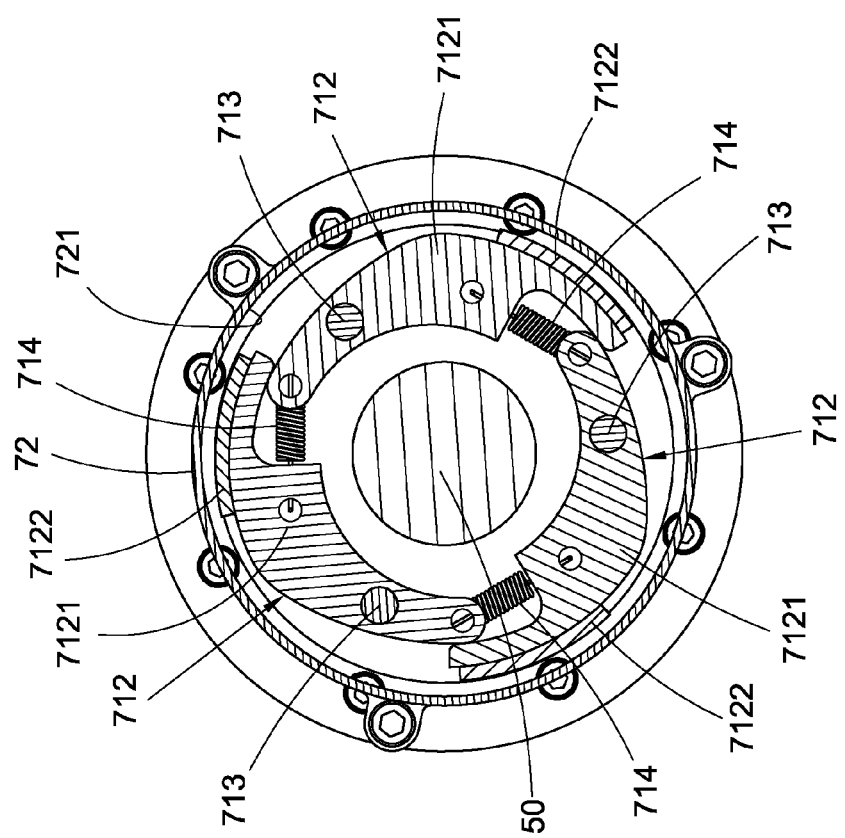
FIG. 8 is a sectional view taken along line a-a of FIG. 7, showing that the second brake assembly releases the shaft.

Please refer to FIGS. 1 to 9. According to a preferred embodiment, the shaft brake mechanism 10 of wind power generator of the present invention includes a board-like bed 20, a first pier 30, a second pier 40, a shaft 50, a first brake assembly 60 and a second brake assembly 70.

The piers 30, 40 are side by side disposed on the bed 20. Each of the piers 30, 40 has an upright plate-like seat body 31, 41 in which a bearing is inlaid. The bearings of the piers 30, 40 have central shaft holes, which are coaxially aligned with each other.

The shaft 50 is rotatably fitted through the shaft holes of the bearings and bridged between the piers 30, 40.

The first brake assembly 60 provides braking effect for the shaft 50 by means of disc brake technique. The first brake assembly 60 includes an annular disc 61 coaxially fixedly fitted around the shaft 50 between the piers 30, 40. The disc 61 is rotatable with the shaft 50. The first brake assembly 60 further includes a clamping section 62 for tightly clamping the disc 61 to provide braking effect. The first brake assembly 60 further includes a link section 63 drivable by a drive section 64 for controlling the clamping section 62 to or not to provide braking effect for the shaft 50.

To speak more specifically, the clamping section 62 has a U-shaped support 621 having a horizontal section and two upright sections. The horizontal section of the U-shaped support 621 is fixedly disposed on the bed 20. Each of the upright sections has a free end serving as a first fulcrum 622. The clamping section 62 further has two elongated rock arms 623 each having a first end, a middle section and a second end. The middle sections of the rock arms 623 are respectively pivotally connected with the first fulcrums 622. Two clamping members 624 are respectively pivotally connected with the first ends of the rock arms 623 and rotatable between a clamping position and a releasing position. A resilient member 625 is bridged between the second ends of the rock arms 623 for resiliently keeping the clamping members 624 in the releasing position. To speak more specifically, each clamping member 624 has a clamping plate 6241. Two linings 6242 are respectively attached to the opposite faces of the clamping plates 6241. Two pivot blocks 6243 are respectively fixed on the other faces of the clamping plates 6241. The pivot blocks 6243 are pivotally connected with the first ends of the rock arms 623 via pivot shafts.

The link section 63 has a rod-like second fulcrum 631 fixedly disposed on the bed 20. The link section 63 further has a bar member 632 having a first end, a middle section and a second end. The first end of the bar member 632 is perpendicularly pivotally connected with the second fulcrum 631, whereby the bar member 632 is rotatable about the second fulcrum 631 between a first position and a second position. The link section 63 further has a board-shaped push block 633 with a trapezoidal cross section. A middle section of the push block 633 is pivotally connected with the middle section of the bar member 632. Two lateral slopes 6331 of the push block 633 respectively abut against the second ends of the rock arms 623. Accordingly, when the bar member 632 is moved to the first position, the push block 633 is urged to move toward the first ends of the rock arms 623 and interpose between the second ends thereof. At this time, the two lateral slopes 6331 push the second ends of the rock arms 623 away from each other to make the clamping members 624 move to the clamping position. When the bar member 632 is moved to the second position, the push block 633 is moved from between the second ends of the rock arms 623. At this time, the resilient member 625 applies a resilient force to the rock arms 623 to restore the clamping members 624 to the releasing position.

The drive section 64 has a linear actuator 641 mounted on the bed 20. The drive section 64 has a power output shaft normal to an axis of the shaft 50. The drive section 64 has a connection rod 642 having a first end and a second end. The first end of the connection rod 642 is perpendicularly fixedly connected with the power output shaft of the actuator 641. The second end of the connection rod 642 extends into a slide slot 6321 formed at the second end of the bar member 632 and is slidable within the slide slot 6321.

Accordingly, the drive section 64 can drive the push block 633 of the link section 63 to push and move the clamping members 624 to the clamping position where the linings 6242 tightly abut against two faces of the disc 61. Under such circumstance, the disc 61 is restrained against rotation to provide braking effect for the shaft 50. Reversely, the drive section 64 can also drive the push block 633 of the link section 63 to release the rock arms 623 from the push force. At this time, the resilient member 625 pulls the rock arms 623 to restore the clamping members 624 to the releasing position. Under such circumstance, the shaft 50 is permitted to freely rotate again.

It should be noted that in the first brake assembly 60, the link section 63 is a second-class lever in which the point of resistance is between the fulcrum and the point of effort. Therefore, the force applied to the link section 63 by the actuator 641 is always smaller than the force exerted onto the clamping section 62 to provide braking effect for the shaft 50. Moreover, the push block 633 has two lateral slopes for pushing the rock arms 623. Therefore, only a little effort is required for providing braking effect for the shaft. In comparison with the conventional technique, the shaft brake mechanism of the present invention has power-saving and energy-saving effect.

The second brake assembly 70 includes a hoof section 71 annularly disposed on the shaft 50 and synchronously rotatable with the shaft 50. The second brake assembly 70 further includes a ring-shaped drum 72 fixedly mounted on the second pier 40 and positioned around the hoof section 71 with the shaft 50 coaxially passing through the drum 72. The shaft 50 can be restrained against rotation under frictional force between the hoof section 71 and an inner circumference 721 of the drum 72.

To speak more specifically, the hoof section 71 has an annular plate-like base 711 coaxially fitted around and fixed with the shaft 50. The hoof section 71 further has three hoofs 712 each having a pivot shaft 713. The hoofs 712 are respectively pivotally mounted on the base 711 via the pivot shafts 713 and positioned around the shaft 50 at equal angular intervals. That is, the hoofs 712 are arranged in a pattern centered at the axis of the shaft 50 with the pivot shafts 713 positioned at 120-degree intervals. The axes of the pivot shafts 713 are parallel to the axis of the shaft 50. Accordingly, the hoofs 71 can be pivotally rotated between a braking position and a releasing position. A resilient member 714 such as an extension spring is bridged between each two adjacent hoofs 712 for resiliently restoring the hoofs 712 from the braking position to the releasing position.

Each hoof 712 has a substantially arc-shaped hoof plate 7121 pivotally disposed on the pivot shaft 713 and a lining 7122 attached to a face of the hoof plate 7121 that faces the inner circumference 721 of the drum 72. Accordingly, when the hoofs 712 are positioned in the braking position, the linings 7122 tightly attach to and abut against the inner circumference 721 of the drum 72 to apply a dynamic frictional force to the drum 72. Under such circumstance, the shaft 50 is restrained against rotation.

Figure 10B:
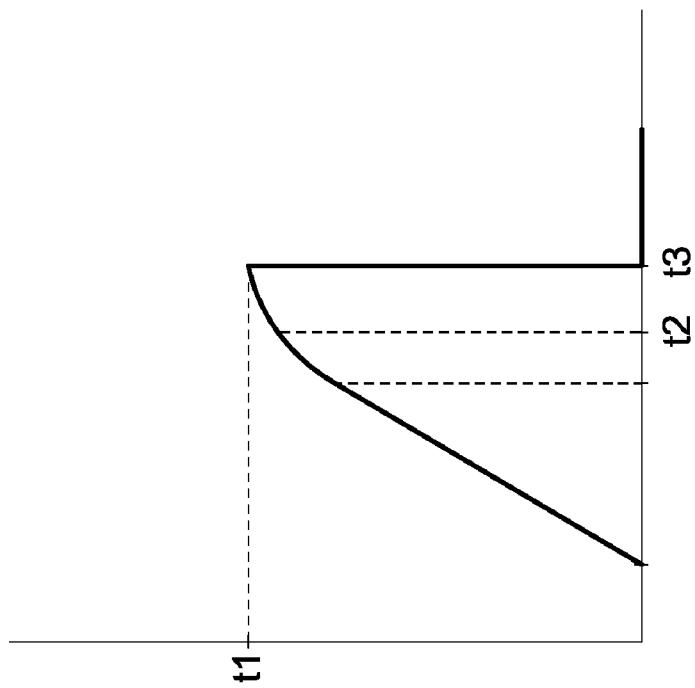
FIG. 10B is a curve diagram showing that without modifying the nominal upper limit of rotational speed of the shaft, the nominal upper limit of operational wind speed increases from t2 to t3.
Figure 10A:
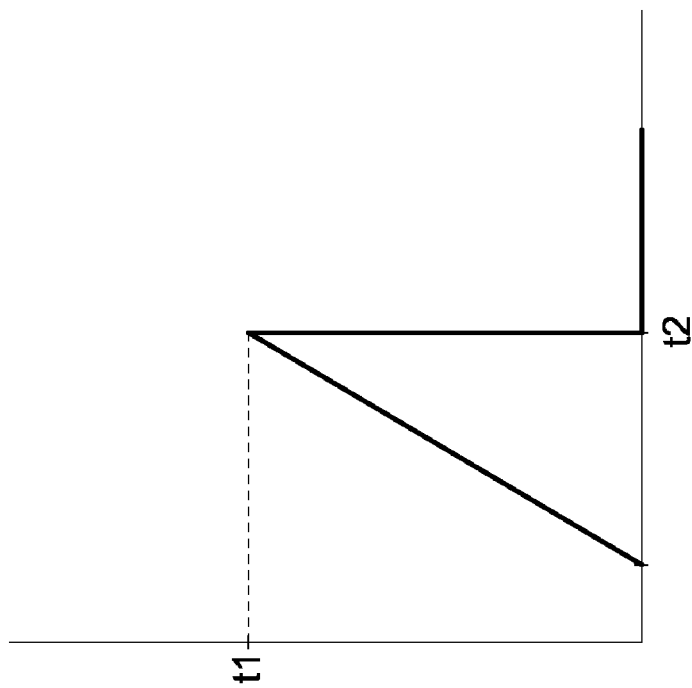
FIG. 10A is a curve diagram showing that when the wind speed reaches the nominal upper limit t2, the shaft is braked and stopped.

When the hoof section 71 is synchronously rotated with the shaft 50 under wind power, a centrifugal force is created in direct proportion to the rotational speed of the shaft 50. When the rotational speed of the shaft 50 is approximate to a nominal upper limit t1, the centrifugal force will overcome the pulling force of the resilient members 714 to make the hoofs 712 move from the releasing position to the braking position. The higher the rotational speed is, the tighter the linings 7122 abut against the inner circumference 721 and the greater the frictional force is, that is, the greater the resistance against the rotation of the shaft 50 is. Accordingly, the second brake assembly 70 can naturally restrain the rotational speed of the shaft 50 from proportionally increasing with the wind speed. As shown in FIG. 10B, without modifying the nominal upper limit t1 of rotational speed, the nominal upper limit of operational wind speed can increase from t2 to t3. Therefore, the operation time of the wind power generator can be prolonged to more efficiently utilize natural resource and increase total power generation capacity of the wind power generator.

The above embodiment is only used to illustrate the present invention, not intended to limit the scope thereof. Many modifications of the above embodiment can be made without departing from the spirit of the present invention.

What is claimed is:

1. A shaft brake mechanism of wind power generator, comprising:
   a shaft;
   an annular disc coaxially fixedly fitted around the shaft and synchronously rotatable with the shaft;
   a clamping section having two first fulcrums and two elongated rock arms each having a first end, a middle section and a second end, the middle sections of the rock arms being respectively pivotally connected with the first fulcrums, the clamping section further having two clamping members respectively pivotally connected with the first ends of the rock arms and rotatable between a clamping position and a releasing position, when positioned in the clamping position, the clamping members tightly abutting against two faces of the disc to brake the disc against rotation, when positioned in the releasing position, the clamping members moving away from the two faces of the disc, a resilient member being bridged between the second ends of the rock arms for resiliently keeping the clamping members in the releasing position;
   a link section having a second fulcrum and a bar member having a first end, a middle section and a second end, the first end of the bar member being pivotally connected with the second fulcrum, whereby the bar member is rotatable about the second fulcrum between a first position and a second position, the link section further having a push block with a substantially trapezoidal cross section, the push block having two lateral slopes respectively adjacent to the second ends of the rock arms, a middle section of the push block being pivotally connected with the middle section of the bar member, when the bar member is moved to the first position, the push block being urged to move toward the first ends of the rock arms and interpose between the second ends thereof, whereby the two lateral slopes push the second ends of the rock arms away from each other to make the clamping members move to the clamping position, when the bar member is moved to the second position, the push block being moved from between the second ends of the rock arms, whereby the resilient member applies a resilient force to the rock arms to restore the clamping members to the releasing position; and
   a drive section for supplying power to drive and reciprocally move the bar member between the first position and the second position.

2. The shaft brake mechanism of wind power generator as claimed in claim 1, wherein the clamping section includes a U-shaped support, the U-shaped support having two free ends serving as the first fulcrums respectively.

3. The shaft brake mechanism of wind power generator as claimed in claim 1, wherein each clamping member has a clamping plate, a lining attached to one face of the clamping plate and a pivot block disposed on the other face of the clamping plate, the pivot blocks of the clamping members being pivotally connected with the first ends of the rock arms respectively.

4. The shaft brake mechanism of wind power generator as claimed in claim 1, wherein the push block is board-shaped.

5. The shaft brake mechanism of wind power generator as claimed in claim 1, wherein a slide slot is formed at the second end of the bar member, the drive section including a linear actuator and a connection rod, one end of the connection rod being connected with a power output shaft of the linear actuator, the other end of the connection rod extending into the slide slot and being slidable within the slide slot.

* * * * *